Dec. 8, 1970          H. R. BOTEFUHR ET AL.          3,546,502
      ELECTRIC HAND TOOL WITH HEAT CONDUCTIVE THRUST BEARING MEANS
Filed Feb. 19, 1969                              2 Sheets-Sheet 2
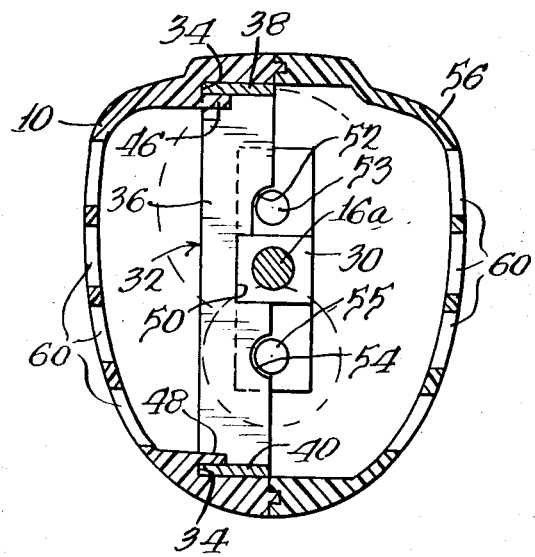
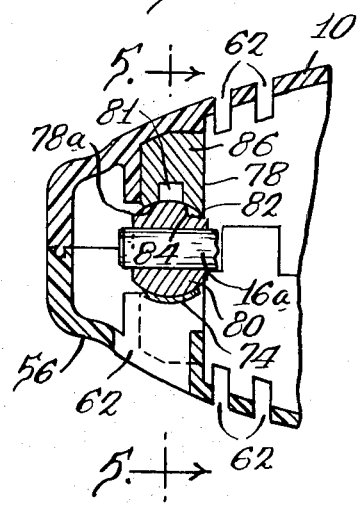
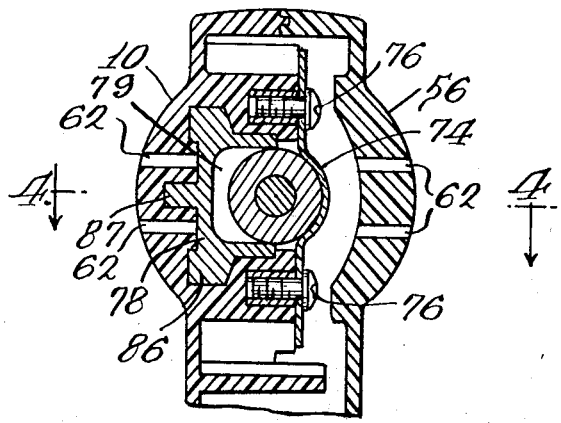

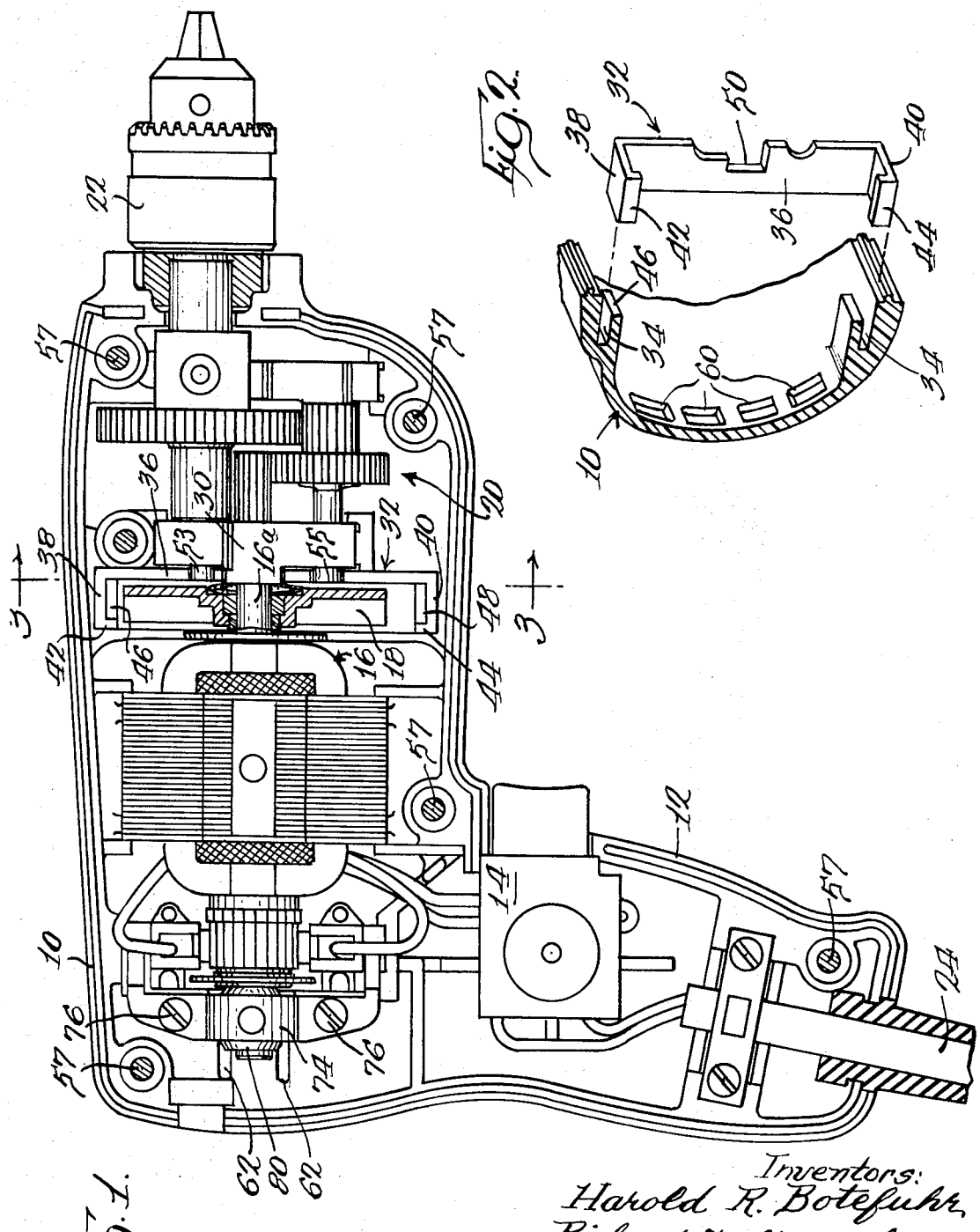

United States Patent Office 3,546,502
Patented Dec. 8, 1970

3,546,502
ELECTRIC HAND TOOL WITH HEAT CONDUCTIVE THRUST BEARING MEANS
Harold R. Botefuhr, Bensenville, and Richard F. Stavenhagen, St. Charles, Ill., assignors to G. W. Murphy Industries, Inc., a corporation of Texas
Filed Feb. 19, 1969, Ser. No. 800,528
Int. Cl. H02k 7/14
U.S. Cl. 310—50                                   9 Claims

ABSTRACT OF THE DISCLOSURE

An electric tool or the like having a two-piece housing separable along a center line and a motor mounted in the housing with the motor shaft received in front and rear bearings. The front bearing is mounted against a heat-conductive thrust bearing member having flanges provided with in-turned ends encircling lugs molded in one-half of the housing, and having a web portion between the flanges nested in a molded slot in the same housing half. The web portion has one edge cut out laterally for receiving said front bearing and for optionally receiving shaft ends for elements of a gear train. The bearing mounting member absorbs thrust loads from the bearing, conducts heat away from the bearing, thereby avoiding warpage of the housing, and has an exposed surface for heat exchange with cooling air being drawn through the housing and into contact with the mounting member by means of an adjacent fan blade driven by the motor. The rear bearing can be received in a heat dissipating insert embedded in the housing, which insert is not susceptible to load distortion normally associated with plastic housings.

BACKGROUND OF THE INVENTION

Field of the invention

This invention relates to power tools and especially portable electric tools and to a system for mounting a heat-generating bearing in such tools.

The prior art

Electric tools such as portable electric drills have had, and continue to have, wide acceptance by the consuming public. One continuing problem in such tools has been the elimination of internal heat buildup. This has become more of a problem with the more recent development and use of high impact-resistant plastics suitable for forming housings for such tools. Such plastics are generally much more highly heat-insulating than the metal type materials and impede dissipation of heat.

SUMMARY OF THE INVENTION

This invention is concerned with absorbing thrust loads and lessening heat buildup in an electric tool. In one form of the invention, the mounting member not only absorbs thrust loads but also extracts or conducts heat from a heat-producing bearing. The extracted heat is dissipated into an air stream passing through the housing. According to the invention, the bearing is mounted in direct heat conducting contact with a heat conductive bearing mounting member received in the tool housing. A second heat conductive insert is molded in place to dissipate heat buildup in one of the bearings in the housing.

While this invention is scusceptible of embodiment in many different forms, there are shown in the drawings and will be described herein in detail two specific embodiments of the invention with the understanding that such description is illustrative and is not intended to limit the sprit and scope of the invention.

BRIEF DESCRIPTION OF THE DRAWINGS

FIG. 1 illustrates an electric drill with half of the housing removed and including an embodiment of the bearing mounting system of this invention;

FIG. 2 is an exploded perspective view of the mounting member and related parts of the housing half;

FIG. 3 is a fragmentary section along line 3—3 of the drill of FIG. 1 but including the other housing half;

FIG. 4 is a fragmentary horizontal section through the rear bearing mounting system of FIG. 1 taken along line 4—4 of FIG. 5; and FIG. 5 is a fragmentary section along line 5—5 of FIG. 4.

DESCRIPTION OF THE PREFERRED EMBODIMENTS

Referring especially to FIG. 1, an electric tool is illustrated in a form of an electric drill including a first molded plastic housing half 10. The drill has a handle portion 12 with a trigger switch 14 for operating a motor 16 mounted in the body portion of the housing. Motor 16 drives a fan blade 18 mounted on the motor shaft and also drives a gear system or drive train 20 which in turn drives an external chuck 22. Power is supplied through switch 12 to motor 16 by power cord 24.

Referring to FIGS. 1, 2 and 3, shaft 16a of motor 16 is received in a bearing 30 which is in turn mounted in the housing by a bearing mounting member 32. Mounting member 32 is a sheet metal, stamped, channel-shaped member having a web portion 36 and two right angular flanges 38 and 40, each having a short in-turned portion 42 and 44 forming end hook elements which are received around upstanding mounting lugs or posts 46 and 48. Web portion 36 is received in a slot 34 which is molded as an integral portion of the plastic housing half 10. The insert 32 is pressed into the slot 34 around the posts 46, 48 after the half 10 is removed from its forming die. Posts 46 and 48 are also molded as integral portions of the housing half. In some operations it has been found that the insert 32 can be molded into the housing at the time the housing is formed.

As best seen in FIGS. 2 and 3, web portion 36 has a bearing receiver 50 as a cutout from one edge of web portion 36. Receiver 50 receives and assists in holding bearing 30 against movement relative to the housing. The walls of receiver 50 of the mounting member 32 have a friction grip on the bearing 30 and serve to absorb some axial thrust from the motor shaft 16a. It has been found that the high impact plastic materials cannot constantly absorb full torque loads without fatigue at some sharp corner area. The mounting member 32 absorbs large amounts of the axial thrust of the shaft 16a on the bearing 30, thereby relieving the thrust on the housing 10. In addition, web portion 36 is in intimate heat-receiving contact with bearing 30 for conducting heat away from bearing 30. Heretofore, heat would build up from the turning of the shaft 16a in the bearing 30, which heat would be forced to be concentrated in the bearing 30 since the high impact material of the housing is substantially an insulating material. The result of the heat buildup in the prior systems was warpage of the housing near the bearing or burn out of the bearing due to overheating. Likewise, heretofore, the thrust loads from shaft 16a into the bearing 30 were transmitted to the housing near the bearing and sometimes caused failure of the housing near the bearing. The shaft 16a in the bearing 30 in the heat dissipating, thrust absorbing mounting member 32 eliminates overheating of the bearing 30, eliminates warpage of the housing surrounding the bearing 30, and eliminates fatigue failure of the housing around the bearing 30. Web portion 36 can include other cutouts such as at 52 and 54 for accommodating rearwardly extending shafts 53, 55 from the drive train 20. The shafts 53, 55 would likewise be supported for thrust absorption by the mounting 32 as well as for minor heat dissipation.

A second plastic housing half 56 can be joined to the first housing half 10 along a central seam line by conventional means such as machine screws 57. Appropriate ribs and lugs in the housing half 56 cooperate with parts of the fixed and movable elements of the gear train, motor and the like to position the parts within the housing to form an operative tool.

Housing halves 10 and 56 are provided with intake vents 60 and exhaust vents 62 so that fan blade 18, having its draft side facing forwardly in the drill, draws air through vents 60 and exhausts through vents 62. In the form illustrated, fan blade 18 is mounted parallel to and closely adjacent the web portion 36 of the bearing mounting 32 to draw air into intimate heat exchange contact with the exposed planar heat radiating front and rear surfaces of web portion 36 for removing heat from mounting member 32. In the illustrated preferred form shown in the drawings, blade 18 is mounted close behind mounting member 32, i.e., between the mounting member and the outlet ports.

Also provided in the illustrated electric tool is a rear bearing heat dissipating insert system. Considering the rear of the tool as shown in FIGS. 4 and 5, plastic housing half 10 has embedded therein a metal, such as aluminum, bearing receiver insert 78 having bearing engaging surfaces 78a for operatively cradling bearing 80. A felt wick 79 is seated in the groove 81 formed between the halves of the seat 78a. Lubricant such as oil can be fed to the wick 79 to lubricate the bearing.

A metal strap 74 holds the bearing 80 against surfaces 78a of insert 78 and is secured in place by machine screws 76. A positioning notch 82 in the bearing 80 receives a key 84 projecting from the surface 78a of the bearing receiver insert 78. Key 84, received in notch 82, retains bearing 80 against rotation in the housing during operation of the motor. Bearing receiver insert 78 has enlarged side corner portions 86 and tongue 87 intermediate thereof which serves to anchor the insert in the material of the housing when the housing is molded around said insert. The portions 86 and 87 provide increased surface area for heat dissipation. The exit air vents 62 are located in close proximity to the bearing 80 and to the heat dissipating insert so that air forced over the motor into contact with said bearing and insert and out the vents 62 will cool the bearing. The bearing 80 will dissipate some of its heat to the insert 78 which will disseminate the heat throughout and over a much larger surface area so that the cooling air will be able to dissipate the heat before damage is done to the material of the housing around the bearing 80.

Another important feature of the rear bearing insert 78 is the ability to provide a positive seat 78a for the bearing 80 which is not susceptible to load distortion. This is, with the prior devices having the bearing nested directly in a cavity in the plastic material, the seat became distorted under load causing misalignment, looseness and tool failure. The heat build up in the bearing also caused warpage and alignment problems heretofore. The load distributing and heat dissipating character of the insert 78 completely overcomes the problems of distortion, warpage and misalignment.

It is apparent from the foregoing that the present invention provides a useful bearing mounting system for portable electric drills and the like which is especially useful in conjunction with plastic drill housings and which is effective in dissipating heat from a heat-producing bearing.

We claim:
1. A power tool having a housing and a drive motor mounted in said housing with a shaft received in a bearing, the improvement which comprises heat-conductive, thrust bearing mounting means receiving said bearing in direct contact therewith for conducting heat away from said bearing and for absorbing thrust loads from the bearing, said mounting means mounting said bearing in said housing, and said heat-conductive mounting means consisting essentially of a channel-shaped metal member engaging said bearing and secured in said housing.

2. The device of claim 1 wherein the flanges of said channel-shaped member point toward the outlet vents and wherein the fan blade is mounted on said shaft adjacent and parallel to the web portion of said channel member between the two channel flanges whereby the fan draws air past and in close proximity with the web portion.

3. The device of claim 1 wherein the flanges of said channel-shaped member have in-turned terminal portions defining hook ends of said heat conductive mounting means and including posts upstanding from the inner portion of the housing received within said hook ends and securing said mounting means against movement relative to said housing.

4. The device of claim 3 wherein said bearing is square and the web portion of said channel-shaped member includes a rectangular edge cutout defining a receiver for laterally receiving one side of said bearing.

5. The device of claim 4 including a drive train beyond said bearing driven by the motor shaft and wherein said web portion includes additional cutouts for accommodating rearwardly extending shafts of said drive train.

6. The device of claim 4 wherein said housing includes first and second housing halves, said first half receiving said channel-shaped member in heat dissipating and axial load bearing relationship with said bearing, and said second housing half interfitting with said first housing half to enclose the operative parts within said housing.

7. A power tool having a housing and a drive motor mounted in said housing with a shaft received in a bearing, the improvement which comprises heat-conductive, thrust bearing mounting means receiving said bearing in direct contact therewith for conducting heat away from said bearing and for absorbing thrust loads from the bearing, said mounting means mounting said bearing in said housing, said mounting means comprises a heat conductive metal insert means having a bearing receiving cavity, means holding the bearing in said cavity and said insert means having an enlarged surface area for dissipation of heat away from the bearing in heat exchange with cooling air.

8. The device of claim 7 wherein said enlarged surface area comprises the surface of enlarged corner portions and a tongue of material of said insert.

9. The device of claim 8 including key means on said insert means extending into a notch in the bearing for securing the bearing against rotation relative to the insert means.

References Cited

UNITED STATES PATENTS

| 3,252,020 | 5/1966 | Consoli | 310—64 |
| 3,203,096 | 8/1965 | Beisheim et al. | 310—50X |
| 3,270,223 | 8/1966 | Seely | 310—64X |

RICHARD O. HIRSHFIELD, Primary Examiner

B. A. REYNOLDS, Assistant Examiner

U.S. Cl. X.R.

308—77; 310—64